United States Patent
Yelton et al.

(10) Patent No.: US 11,962,838 B2
(45) Date of Patent: **\*Apr. 16, 2024**

(54) SYSTEMS AND METHODS FOR CUSTOMIZING A DISPLAY OF INFORMATION ASSOCIATED WITH A MEDIA ASSET

(71) Applicant: Rovi Guides, Inc., San Jose, CA (US)

(72) Inventors: Alexis Yelton, Somerville, MA (US); Abhijeet Sharma, Boston, MA (US); Peter Boonstra, Arlington, MA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,874

(22) Filed: Oct. 28, 2021

(65) Prior Publication Data

US 2022/0053234 A1 Feb. 17, 2022

Related U.S. Application Data

(63) Continuation of application No. 17/028,217, filed on Sep. 22, 2020, now Pat. No. 11,277,657, which is a continuation of application No. 16/046,492, filed on Jul. 26, 2018, now Pat. No. 10,820,037, which is a continuation of application No. 15/799,012, filed on Oct. 31, 2017, now Pat. No. 10,063,910.

(51) Int. Cl.
| | |
|---|---|
| H04N 21/45 | (2011.01) |
| G06F 16/40 | (2019.01) |
| H04N 21/431 | (2011.01) |
| H04N 21/44 | (2011.01) |
| H04N 21/482 | (2011.01) |

(52) U.S. Cl.
CPC ........ *H04N 21/4316* (2013.01); *G06F 16/40* (2019.01); *H04N 21/44008* (2013.01); *H04N 21/4532* (2013.01); *H04N 21/4821* (2013.01)

(58) Field of Classification Search
None
See application file for complete search history.

(56) References Cited

U.S. PATENT DOCUMENTS

| | | | |
|---|---|---|---|
| 4,864,502 A | * | 9/1989 | Kucera ................. G06F 40/253 704/8 |
| 6,239,794 B1 | | 5/2001 | Yuen et al. |
| 6,388,714 B1 | | 5/2002 | Schein et al. |
| 6,564,378 B1 | | 5/2003 | Satterfield et al. |

(Continued)

FOREIGN PATENT DOCUMENTS

| | | |
|---|---|---|
| WO | 9506912 A1 | 3/1995 |
| WO | 2016081530 A1 | 5/2016 |

OTHER PUBLICATIONS

PCT International Search Report and Written Opinion for International Application No. PCT/US2018/039266, dated Sep. 19, 2018 (13 pages).

*Primary Examiner* — Jefferey F Harold
*Assistant Examiner* — Charles N Hicks
(74) *Attorney, Agent, or Firm* — HALEY GUILIANO LLP

(57) ABSTRACT

Systems and methods are described for customizing a display of media asset information based on a user preference profile. In particular, media asset description information is customized by changing a term to a synonym that matches an event or keyword in the user preference profile.

20 Claims, 9 Drawing Sheets

(56) References Cited

U.S. PATENT DOCUMENTS

| | | |
|---|---|---|
| 6,756,997 B1 | 6/2004 | Ward et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 9,307,290 B1* | 4/2016 | Finster ............... H04N 21/8405 |
| 10,063,910 B1 | 8/2018 | Yelton et al. |
| 10,088,983 B1* | 10/2018 | Qaddoura ........ H04N 21/23439 |
| 10,820,037 B2 | 10/2020 | Yelton et al. |
| 11,277,657 B2* | 3/2022 | Yelton .................... G06F 16/40 |
| 2002/0087985 A1 | 7/2002 | Kamen et al. |
| 2002/0129370 A1 | 9/2002 | Kikinis |
| 2002/0174430 A1 | 11/2002 | Ellis et al. |
| 2002/0199166 A1 | 12/2002 | Volcani et al. |
| 2003/0110499 A1 | 6/2003 | Knudson et al. |
| 2003/0221198 A1 | 11/2003 | Sloo |
| 2005/0240957 A1 | 10/2005 | Tsunokawa et al. |
| 2005/0251827 A1 | 11/2005 | Ellis et al. |
| 2009/0125938 A1 | 5/2009 | Ho et al. |
| 2010/0153885 A1 | 6/2010 | Yates |
| 2011/0099157 A1 | 4/2011 | Lebeau et al. |
| 2011/0313775 A1 | 12/2011 | Laligand et al. |
| 2014/0101703 A1 | 4/2014 | Miyoshi |
| 2015/0181289 A1* | 6/2015 | Wheatley ........... H04N 21/4661 725/14 |
| 2015/0358661 A1* | 12/2015 | Navarro ............. H04N 21/2665 725/59 |
| 2016/0147760 A1 | 5/2016 | N et al. |
| 2016/0162472 A1* | 6/2016 | Lynch ................... G06F 3/0484 715/780 |
| 2016/0335355 A1 | 11/2016 | Vandanapu et al. |
| 2017/0063775 A1 | 3/2017 | Akolkar et al. |
| 2017/0286424 A1 | 10/2017 | Peterson |
| 2019/0132637 A1 | 5/2019 | Yelton et al. |
| 2021/0112300 A1 | 4/2021 | Yelton et al. |

* cited by examiner

700

The Dunphy Family Dresses up for an Island Wedding. ~704

800

A 600-mile-wide Typhoon Continues to Ravage the Fleet. Rookie Skippers Struggle Just to Keep their Heads Above Water. ~804

SYSTEMS AND METHODS FOR CUSTOMIZING A DISPLAY OF INFORMATION ASSOCIATED WITH A MEDIA ASSET

CROSS-REFERENCE TO RELATED APPLICATION

This application is a continuation of U.S. patent application Ser. No. 17/028,217, filed Sep. 22, 2020, which is a continuation of U.S. patent application Ser. No. 16/046,492, filed Jul. 26, 2018, now U.S. Pat. No. 10,820,037, which is a continuation of U.S. patent application Ser. No. 15/799,012, filed Oct. 31, 2017, now U.S. Pat. No. 10,063,910. The disclosures of which are hereby incorporated by reference herein in their entireties.

BACKGROUND

Media content providers provide information about content to viewers to entice them to access and view the content. This can be accomplished in many ways, for example, by arranging content choices in a display screen in a certain manner, advertisements, placement of highlighted materials, or selecting certain media content based on a user preference profile. Given the multitude of media content choices, it can be difficult to attract a viewer with such displays without adding further customizations to attract the user.

SUMMARY

Accordingly, systems and methods are provided for enhancing access to a media asset by customizing description information for the media asset to be tailored to a user or viewer by changing terms in the description information based on a user's preference profile. In particular, a media guidance application may revise the description information to include a synonym or a related word of some term in the description information that matches a keyword or event in the user preference profile. By substituting a keyword from the user preference profile into a description of a media asset, a user may be more inclined to select that media asset.

In an example, a media guidance application may receive a user preference profile and parse the user preference profile to obtain an event associated with the user. The user preference profile may be obtained from a source associated with the media guidance application and may include typical user preference information, for example, information about the user, user selected media choices and preferences, as well as user information obtained by monitoring the user's media interactions with the media guidance application and other media access points. An event associated with the user may be any type of user event, for example, a user media-related event or action, a place, incident, location, historic occurrence, natural disaster, weather pattern, concert or performance, travel or trip, or other event. In general, events are meant to be current and are replaced periodically or updated in the user preference profile. Events can have an associated time or temporal element so that its timeliness can be confirmed. Events may also be based on information about a user that is input by an associate or friend of the user. For example, a user's friend may post information about the user on social media that may be monitored and stored in connection with the user. Events can also be obtained from non media sources, such as a user's calendar or other source of information about the user. Keywords associated with the event may be stored in the user preference profile. The keywords may be, for example, specified terms that are related to the event or that were entered as text or other input in an action related to the event. Such keywords can be stored in the user preference profile.

The media guidance application may receive metadata associated with a media asset and extract description information from the metadata associated with the media asset. Media asset metadata may be obtained by the media guidance application from a media source and can include various information for the media asset including, for example, title, actors, episode details, description information and other details relating to the media asset. These details may be stored by the media guidance application in memory in a manner in which the description information can be extracted by the media guidance application.

The media guidance application may determine a synonym for at least one term in the description information. The terms in the description information may be analyzed and one more of the terms may be selected to identify a synonym. The synonym or synonyms may be obtained from a thesaurus or other such resource. Synonyms can also include related terms which have commonalities with terms and concepts. The media guidance application may then compare the synonym with the keywords associated with the event from the user preference profile. A match of a synonym and a keyword may be identified by the media guidance application. The media guidance application may then generate a customized display of the media asset description information by substituting the synonym for the term in the description information.

In an illustrative example, a user may have a user preference profile which includes an event relating to a hurricane. The event may have been added to the user preference profile in any number of ways, for example, the user may have previously searched for or viewed media content relating to a hurricane, the user may have been tagged in social media in a hurricane, the user may have posted in social media about a hurricane, the user may have made a donation to a hurricane relief charity, the user may be located in an area having a hurricane watch, the user may have travel plans to a place having a hurricane watch, or other hurricane related event. The media guidance application may receive media asset data that includes television shows that relate to typhoons and which include typhoon terminology in its respective description information. In this example, the media guidance application may find "hurricane" as a synonym for "typhoon" and match it to the user preference profile for the hurricane event. The media guidance application may then generate a user customized display that includes the television show's description information substituting the synonym "hurricane" where "typhoon" had previously appeared.

The customized view of the display can also highlight the use of the synonym in the description information. For example, the view of the display can highlight the portion of the description information having the substituted synonym in a visual manner, e.g., by changing a font or color of the synonym and terms around the synonym. The synonym can also be placed in a prominent position within the display so that the viewer can see it easily. In another example, the location of the synonym can be reordered to an earlier portion within the description information. For example, the location of the synonym in the context of the description information may be analyzed to determine if it appears in an early, middle or end sentence of the description. If the synonym appears near the end or the middle of the description, its sentence may be moved to an earlier position within the description.

Although, in some implementations, each term in the description information could be selected by the media guidance application to find synonyms that match an event, certain terms could be selected for finding a synonym over other terms based on an analysis by the media guidance application of a respective type of linguistic element of the term. Each type of linguistic element can be assigned a weight and then the terms could be prioritized and selected by the media guidance application based on the priority. An example of linguistic elements and weights could be that nouns have a relatively greater weight than an adjective or a copular verb.

The description information terms can also be selected based on metadata associated with the description information. A tag line or catchphrase may be identified as such in the description information metadata. Terms in a tag line may be selected to find synonyms that match an event in the user preference profile. In addition, certain types of terms, such as nouns or verbs, in the tag line may be selected to file synonyms. Tag lines may also be identified by the media guidance application by analyzing video or audio information associated with the media asset.

In some examples, there may be multiple tag lines that are associated with a media asset. These tag lines may be identified by the media guidance application from the media asset metadata, for example, by analyzing video or audio information associated with the media asset. The media guidance application may parse the plurality of tag lines to identify a term in the tag line having an association with the user profile. The tag lines may be ranked based on the respective association with the user profile and a highest-ranking tag line may be selected from the plurality of tag lines to include in the customized view for display of the media asset the media asset description information.

In another example, one or more tag lines may be identified by the media guidance application by analyzing metadata associated with a media asset. The media guidance application may determine a frequency of use or popularity of the tag lines by performing a search of media sources and/or social media sources. Frequency of use of a tag line and types of use for a tag line may have an associated weight that is assigned to the tag line. One or more of the tag lines may be selected based on a ranking of the weighted tag lines. In some examples, the terms in the selected tag lines may also be analyzed to determine its linguistic element which may also be weighted and ranked to prioritize certain terms within a tag line.

In another example, a time may be associated with the modified description. The time may be used to confirm relevancy of the modified description. For example, after a threshold time or some change in a user preference profile, the modified description may become less relevant and it will be discarded. In such scenarios, the media guidance application may analyze additional media asset description information and the user preference profile to find new material to customize for the user, or return to using an original version of media asset related data.

In some implementations, the media guidance application may analyze more than one term from a media asset description and find several synonyms for each term. When the media guidance application compares the synonyms with the user preference profile event keywords, there may be more than one matching set of synonyms and keywords. In this situation, the media guidance application may substitute both of the matching synonyms for a respective original term in the description information. Alternatively, the media guidance application may prioritize the matching synonyms by determining whether there are any characteristics in the user preference profile that may indicate that the use of one or the other of the terms may be more relevant to the user. For example, an event keyword having a characteristic in common with frequent user actions or media asset consumption patterns may indicate that it should be more highly ranked, and accordingly, it may be weighted more highly so that it can be ranked and prioritized as such.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described to customize a display of description information for a media asset. The media guidance application analyzes terms in description information to find certain terms that may have synonyms. The synonyms may be compared by the media guidance application to an event or keywords associated with a user preference profile. A synonym matching the event or keyword associated with the user preference profile may be substituted by the media guidance application for the original term in the description information. A display including the media asset may be customized for the user by showing the substituted synonym in the place of the term in the description information for the media asset. By including an event keyword from a user preference profile in the place of another similar term in a media asset description may cause the user to be more interested in the media asset which may lead to the user selecting the media asset. This can be helpful in making a media asset stand out to a user by leveraging information known to be relevant and interesting to the user and connecting it to the media asset.

Figure 1:
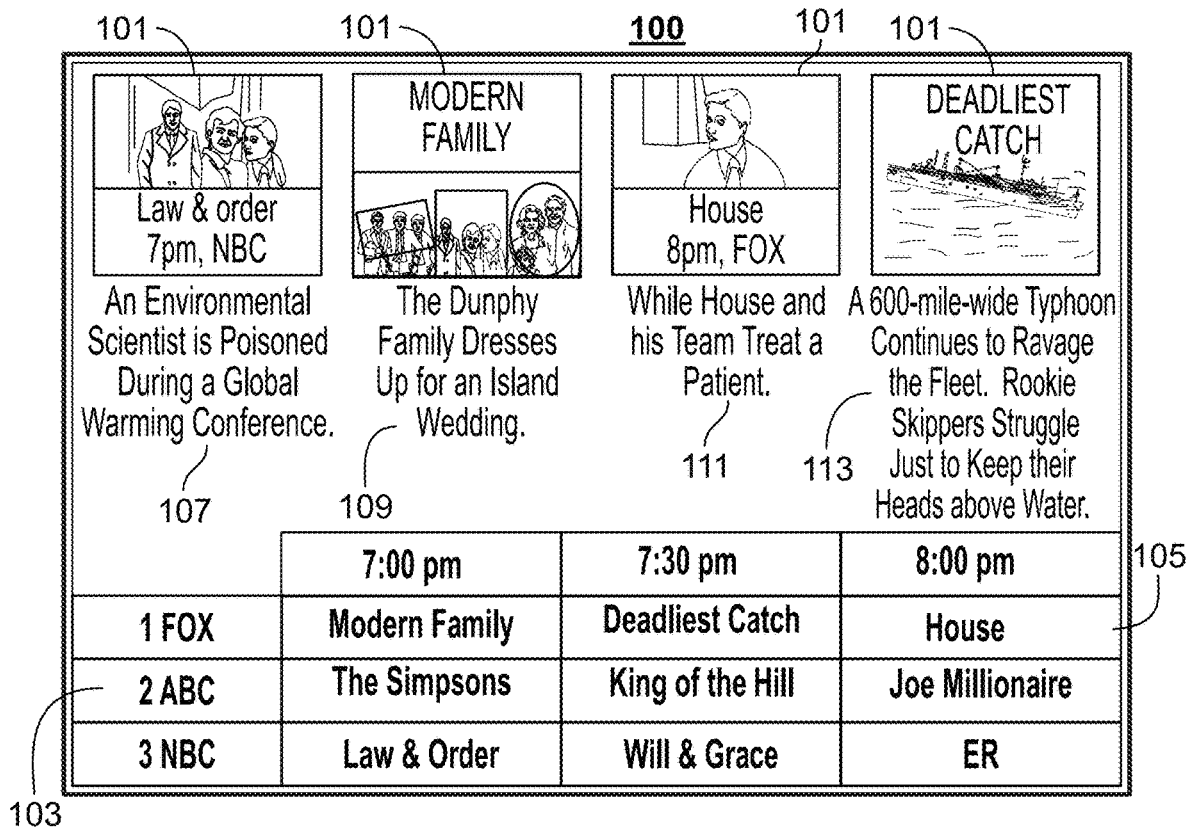
FIG. 1 shows an illustrative example of a display screen generated by a media guidance application in accordance with some embodiments of the disclosure.
Figure 2:
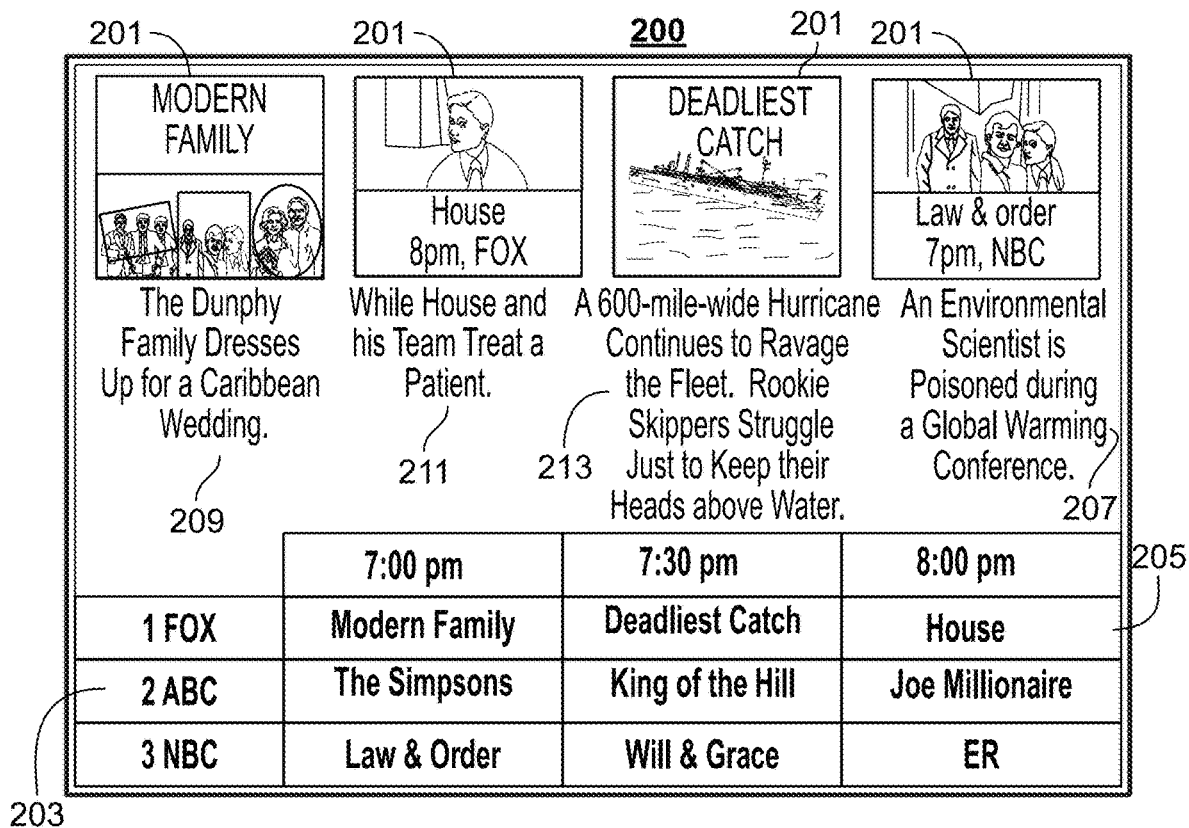
FIG. 2 shows an illustrative example of a customized display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. FIG. 1 depicts media guidance data in display 100 which includes images associated with media content 101 as well as description information 107, 109, 111 and 113 for respective media content 101. The media guidance data 100 may be obtained from a media guidance database and arranged in the display by the media guidance application. Also shown in FIG. 1 are listings for various channels 103 including media programming, e.g., 105. The display screen 100 may include details about media assets and it may be arranged in any suitable format. For example, description information 107, 109, 111 and 113 may be obtained as metadata that is associated with a media asset and displayed in an arrangement for a user. The media asset choices included in the display screen may be selected by the media guidance application, for example, based on availability, current time, media promotional considerations, and/or on user preferences.

FIG. 2 depicts an illustrative display screen for media guidance data that includes elements in common with FIG. 1. FIG. 2 has been further customized from FIG. 1 to include substitutions to the description information to be more attractive to a user. In particular, a description 209 for the program "Modern Family" has been customized for a particular user to substitute the term "island" from the original description 109 (FIG. 1) of the program with "Caribbean" in the customized description 209 (FIG. 2). The substitution may be made by the media guidance application by finding a synonym or related word for a term in the original description information that matches a keyword or event in a user preference profile. Substituting the term "island" with "Caribbean" may resonate with a user and cause them to select the media content.

The use of the term "Caribbean" may be based on an event in the user preference profile relating to the Caribbean. For example, the user may have a travel schedule or calendar that can be accessed and shared with the media guidance application, and which indicates that the user will make a trip to the Caribbean at a certain time. In particular, the media guidance application may search through the user's email accounts to identify past purchases of tickets. In response to identifying a ticket for travel, the media guidance application may determine the destination and keywords associated with the destination along with dates corresponding to the travel. For a certain time period before, during and just after the trip, media content relating to the Caribbean may be of particular interest to the user. Thus, substituting the term "Caribbean" for "island" may cause a media asset to be more appealing to the user. The media guidance application may associate a time element with the custom media description so that it can be used timely and used when it is relevant. After a certain period of time, the custom description information may be discarded and the media guidance application may resume using the original description information for the media asset (e.g., with the word "island" instead of "Carribean"). In some scenarios, the match of the term "island" to "Carribean" may also be based on additional details in metadata for the media asset.

In general, media guidance application may store the keyword or event in the user preference profile in association with user preference profile data. Such keyword and event data can differ, for example, from other types of user preference data that is repeated over a longer term which can indicate longer standing interests. The media guidance application may obtain the keyword or event data from information that is associated with a user including, for example, interactions with a media asset or media guidance application, a location of the user, an enterprise or organization that the user has accessed or joined, a travel itinerary, user calendar, a weather pattern or natural disaster nearby the user or having interest to the user, a news article or other media content accessed by the user, or obtained from a source that tags or associates content with the user, such as a social media tag by a friend of the user for a location or incident that is connected to user. In some implementations, the media guidance application may associate a temporal element with the keyword or event data so that it can be relatively current. In some examples, a time period threshold may be established by the media guidance application and only event data that occurs within the threshold period may be used. Using the time period threshold can ensure that the event data is currently relevant.

In another example, event data that is location specific may be cross referenced by the media guidance application with a user's current location. Event data that is outside of a threshold distance from the user might no longer be relevant. This can be applicable, in an example, if a user is in a hurricane warning zone that is being discussed with reference to the user on social media or a weather source (e.g., the Weather channel), and when the user has left the hurricane zone by some threshold distance. In another example, the user may have a location based event and a weather report may be obtained by the media guidance application for the user location to determine that the user is in or near a hurricane warning zone. These examples of events and keywords are not meant to be limiting, and other types of events and keywords may be used. Use of the events and keywords to substitute into a media asset description is meant to enhance the appeal of the media asset to the user by adding currently relevant terminology for a user to the media asset.

Temporal or time data may also be associated with the customized media asset description by the media guidance application. The customized media asset description may be stored by the media guidance application with time data and used in the customized display for the user. In some implementations, the media guidance application may search for a custom description to use for a user display and will confirm that it is still relevant to the user by, for example, checking the time information for the custom description. If a certain threshold time period has elapsed, the custom description may be discarded or not used. In that case, an original description may be used. In another implementation, location information may be stored for the custom media description and used when generating a custom display for the user. In such embodiments, the media guidance application may check the user's location and compare it to the location information for the custom media description. A threshold distance may be set using the custom description as compared to a user location. If the media guidance application determines that the user is outside of the threshold distance, the custom description information for the media asset may be discarded and an original description may be used in the display instead.

In another example of customizing a media asset description, turning back to FIG. 1, a description 113 for media asset 101 may include the term "typhoon" to describe the episode. A user may have a keyword or event in their respective user preference profile for a "hurricane". This keyword may have come from some media interaction causing an event related to a hurricane to be added to the user preference profile. Alternatively, the keyword "hurricane" may be determined by the media guidance application based on a comparison of the user's current location and weather report keywords associated with that location. Event data can arise from several scenarios, including media interactions, media consumption, user location, social media that a user is associated or tagged in. The event data be added to the user preference profile by the media guidance application and stored in memory in a user preference profile database. The event data can have associated keywords which may be related to the event and sourced from event related information or other sources. For example, a user being tagged in Hurricane Franklin in Mexico on social media may have event data relating to this tag stored in the respective user preference profile with keywords for "hurricane", "Mexico", "Franklin", that are taken from the social media tag. In addition, the media guidance application may obtain information about the event from other sources, such as a weather database or an internet new source or media asset database, which may lead to additional terms such as "rain", "Veracruz", "tropical storm", etc. All of these keywords may be stored in the user preference profile by the media guidance application with a time tag and location tag.

Terms in the description information 113 may be identified by the media guidance application to find suitable synonyms. Although all of the terms of the description could be searched for synonyms, it may be more expeditious and effective to limit a synonym search to certain types of terms that may have a higher contextual value. For example, nouns and verbs may be more useful than an adjective. Certain types of terms may be found to be a slogan or tag line and which may also be more important. The terms in the description information 113 may be selected by the media guidance application analyzing each of the terms to determine linguistic elements of the for the term and seeking metadata associated with the term or uses of the term in videos and audio clips, then assigning a weight to each term based on its relative importance and selecting a term by a ranking of the terms based on the assigned weights.

In some scenarios, a tag line may be found by the media guidance application by analyzing video or audio clips that are associated with media asset description information. The analysis by the media guidance application can include determining whether meta data exists for the video or audio clip that includes any tag line details. In addition, the media guidance application can search databases and social networks for uses of the video clips and audio clips and seek slogans or tag lines associated with the clips. In some scenarios, more than one tag line may be identified by the media guidance application for the media asset. In this case, the tag lines may be ranked by the media guidance application using weights for each tag line that are based on characteristics such as length, frequency of use in social media, or user preferences. For example, the media guidance application may retrieve a set of subtitles associated with a given media asset. The media guidance application may compare segments (e.g., various sentences or word combinations) with a social network to determine whether any of the segments match the content posted to the social network. In response to identifying a segment that is posted more than a threshold number of times, the media guidance application may indicate or determine that the particular segment is a tag line of the media asset. The media guidance application may then select words in the particular segment to search for synonyms of the words. In response to identifying that one of the synonyms matches a preference profile of the user, the media guidance application may substitute the words in the segment with the given synonym matching the profile and present this customized and modified segment to the user as part of the description of the media asset.

The selected terms from the description information 113 may be used by the media guidance application to search for a synonym. The synonyms may be obtained from a thesaurus or other dictionary source. Any synonyms may be compared by the media guidance application against the keywords or events in the user preference profile to find a match. If a match is found, for example, a typhoon synonym "hurricane" may be found by the media guidance application in the user's preference profile. The matching synonym may be used by the media guidance application to generate a customized display for the user.

In some scenarios, more than one match between synonyms and keywords may be found by the media guidance application. When more than one match is identified by the media guidance application between synonyms of terms in a media asset description and a keyword in a user preference profile, the media guidance application may use both matching synonyms in a custom display, or rank the synonyms and select the highest ranking synonym to include in a custom display. The synonyms may be ranked using weights that are assigned by the media guidance application to the word or phrase according to, for example, linguistic element type, user preference profile information, genre of word, a contextual connection to the media asset, or other basis.

Figure 3:
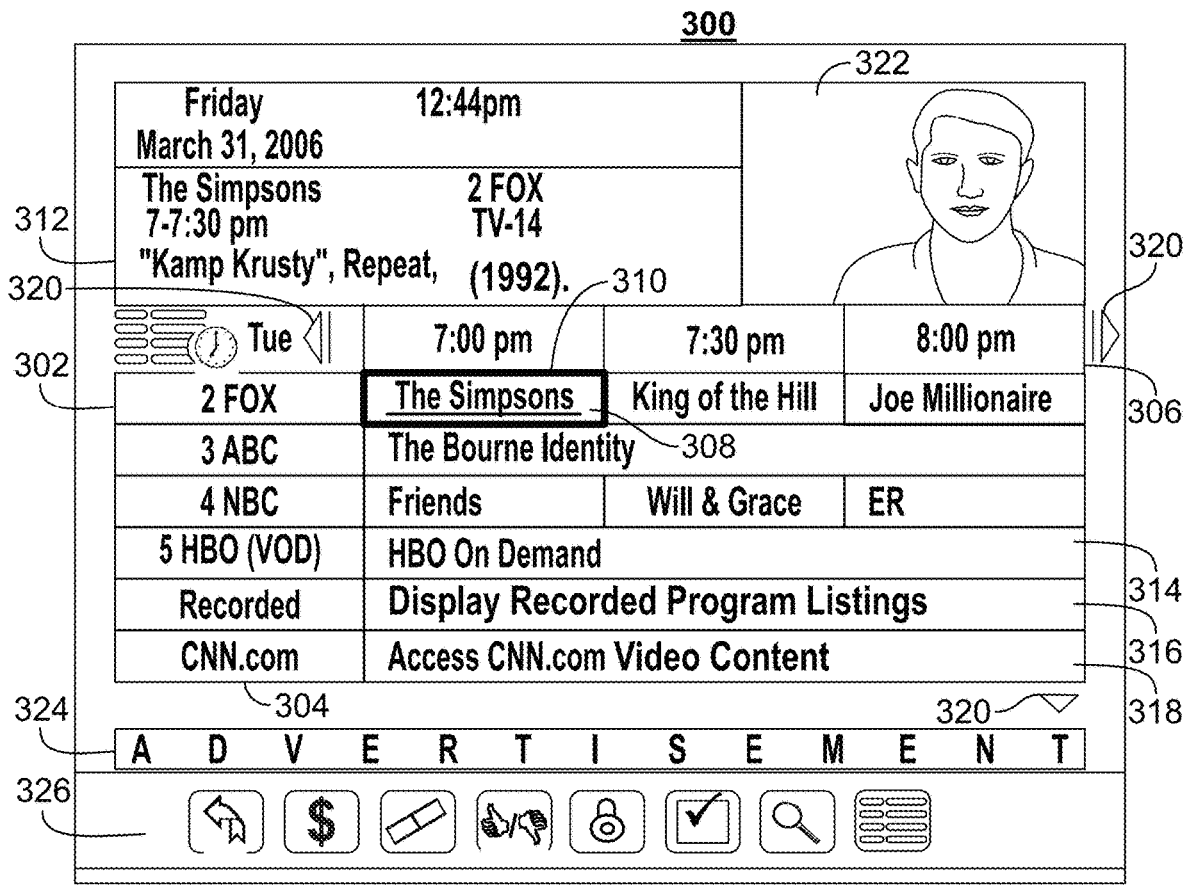
FIGS. 3-4 show other illustrative examples of display screens generated by a media guidance application in accordance with some embodiments of the disclosure.
Figure 4:
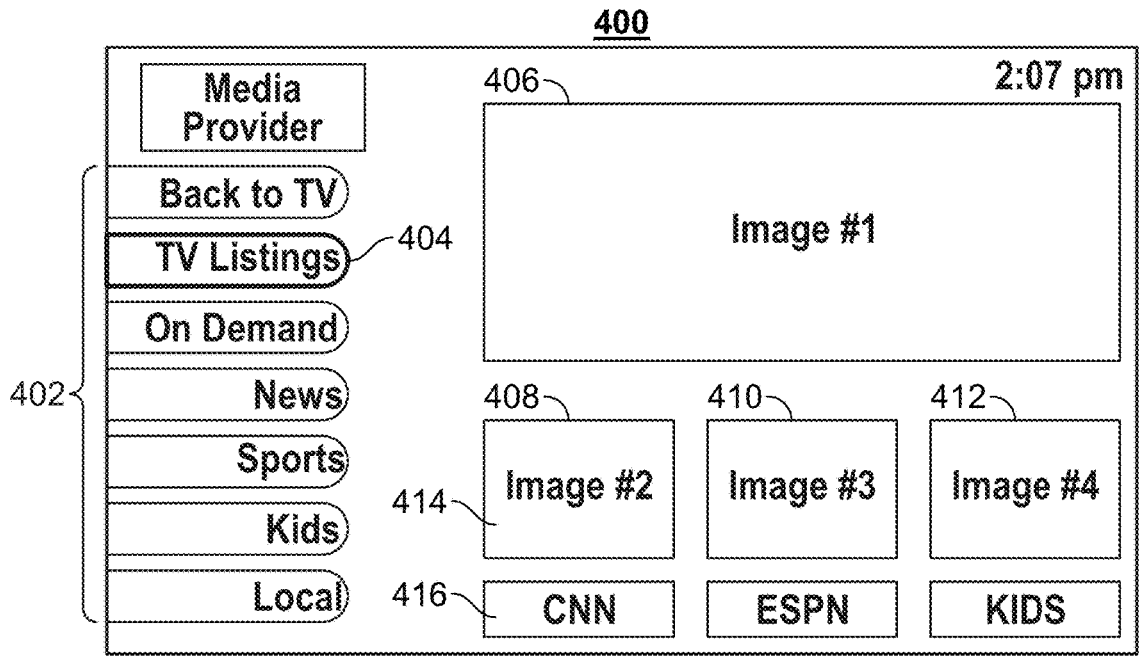

A customized display, such as shown in FIG. 2 may be generated by the media guidance application using the matching synonym so that the description 213 for Deadliest Catch is changed to substitute the term "typhoon" from an original description 113 (FIG. 1) for the respective media asset to "hurricane" in the description 213 (FIG. 2). The new customized description information may be stored by the media guidance application in memory with time and location information so that it can be used when it is timely and suitable. FIGS. 1-2 may optionally include details and elements as described herein with other display screens such as shown in FIGS. 3-4, or other media guidance screens.

The systems and methods may be implemented via an interactive media guidance application running on a user device, a remote server, or another suitable device. The interactive media guidance application may be implemented partially on multiple devices such that some portions of the interactive media guidance application are executed on one device while other portions of the interactive media guidance application are executed on another device.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, advertisement 324, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 324 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 302. Advertisement 324 may also be for products or services related or unrelated to the content displayed in grid 302. Advertisement 324 may be selectable and provide further information about content, provide information about a product or a service, enable purchasing of content, a product, or a service, provide content relating to the advertisement, etc. Advertisement 324 may be targeted based on a user's profile/preferences, monitored user activity, the type of display provided, or on other suitable targeted advertisement bases.

While advertisement 324 is shown as rectangular or banner shaped, advertisements may be provided in any suitable size, shape, and location in a guidance application display. For example, advertisement 324 may be provided as a rectangular shape that is horizontally adjacent to grid 302. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
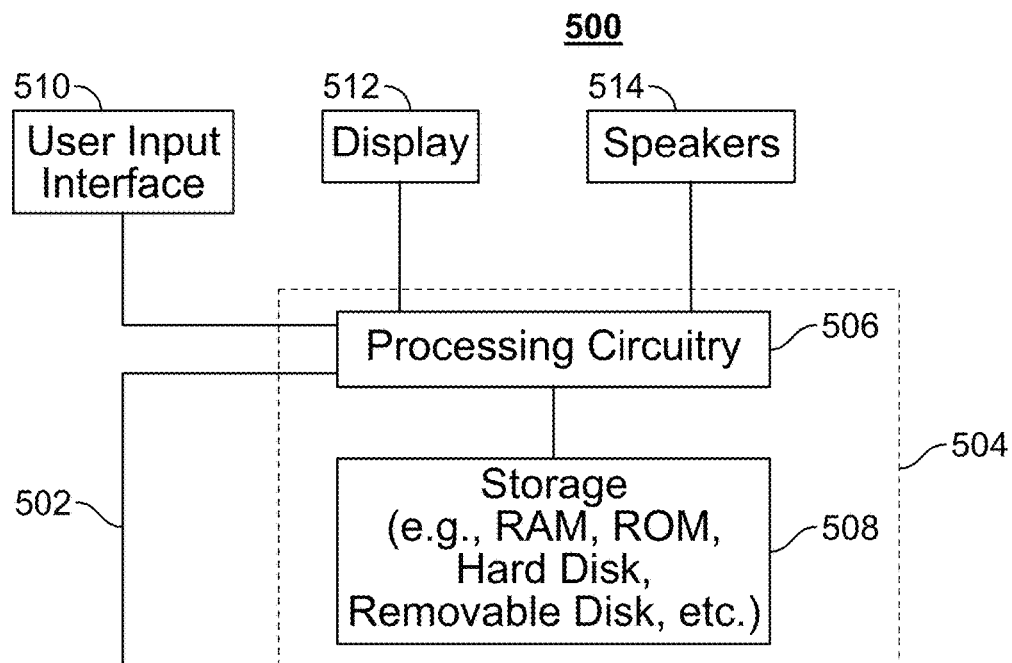
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
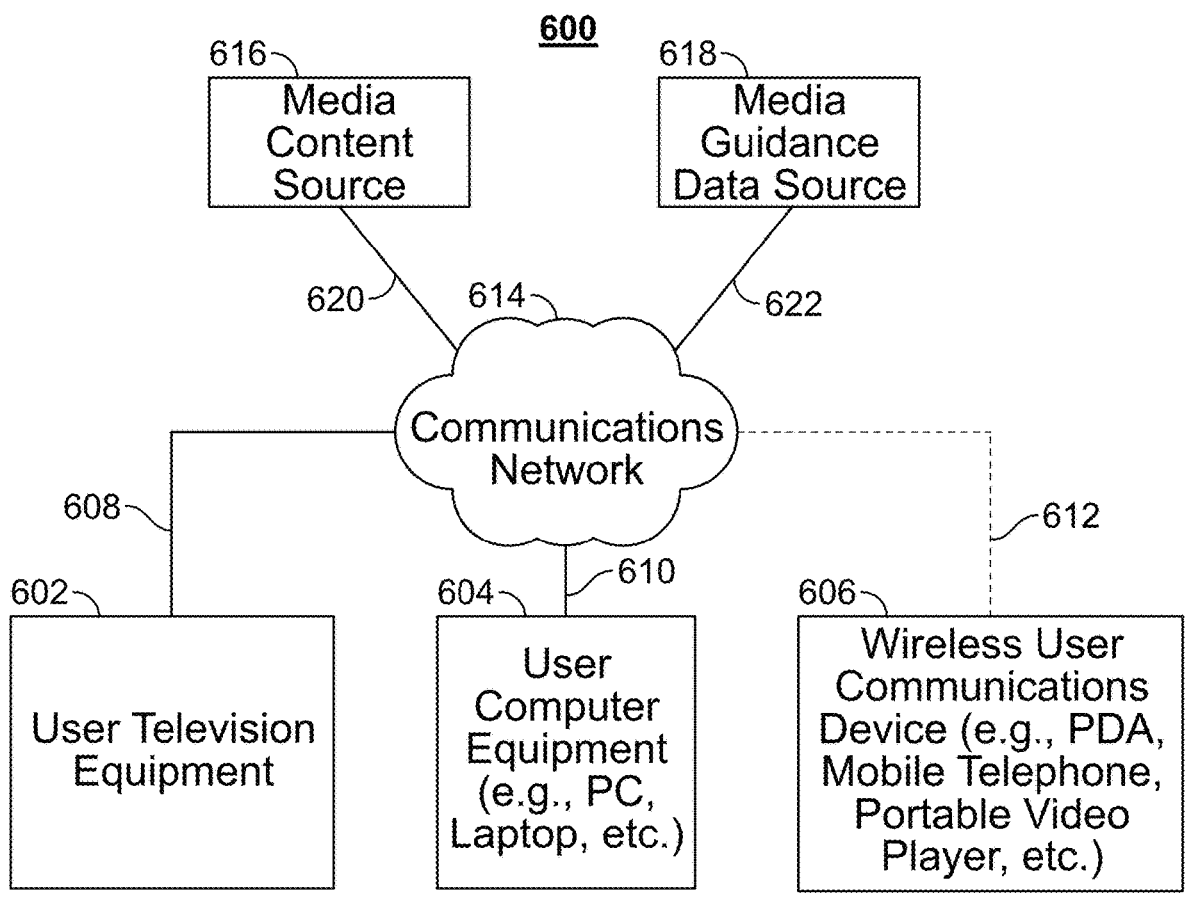
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some user television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
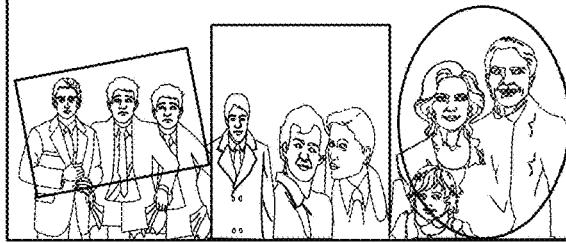
FIGS. 7-8 are illustrative examples of metadata associated with a media asset in accordance with some embodiments of the disclosure.

Customizing a media asset display to be attractive to a viewer can include matching a portion of the user preference profile to data associated with a media asset and highlighting the matching element. In an example, metadata for a media asset may be obtained by a media guidance application from a media source such as media guidance data source 618 (FIG. 6) or media content source 616 (FIG. 6), or other source. The media source can be a media content provider or consolidator of media or other source. The media asset metadata can include any number of details. For example, as shown in FIG. 7 an illustrative data record 700 for a television program can include an image, video clips, audio clips, title 702, actor, tag line, description information, and other details relating to the program. As shown in FIG. 7, a description of an episode of the television show Modern Family reads that "The Dunphy Family dresses up for an island wedding." The media guidance application can extract the description information from the media asset metadata and analyze using control circuitry 504 one or more of its terms to find synonyms for the terms from a thesaurus or other dictionary source. The media guidance application can also receive user preference profile information and obtain events or keywords associated with the user which can be matched with the synonyms. If a match of a synonym and an event or keyword is identified by the media guidance application, the synonym may be substituted in a display of the media asset description information.

The description information 704 includes a single sentence which includes names, nouns, verbs, articles, etc. The terms in the description information 704 may be analyzed by the control circuitry 504 of the media guidance application to determine its respective linguistic elements which can aid in selecting terms to search for synonyms. In an example, the term "island" may have a relatively higher priority because it is a noun. The higher priority may be reflected in a weight assignment by the media guidance application to the term "island". The weight assignment may be used by the media guidance application to rank and prioritize certain terms.

Figure 8:
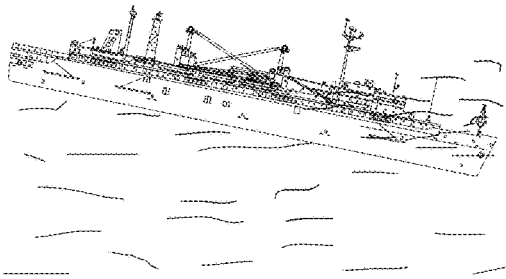

FIG. 8 is another example of a media asset description in a data record 800 for the media asset 802 Deadliest Catch. In this example, there are two sentences in the description about an episode for Deadliest Catch. The media guidance application may analyze the description terms to identify suitable terms for which to find synonyms. Although FIGS. 7 and 8 show certain details for the data records 700, 800, other types of information can be included in data records for media assets.

Figure 9:
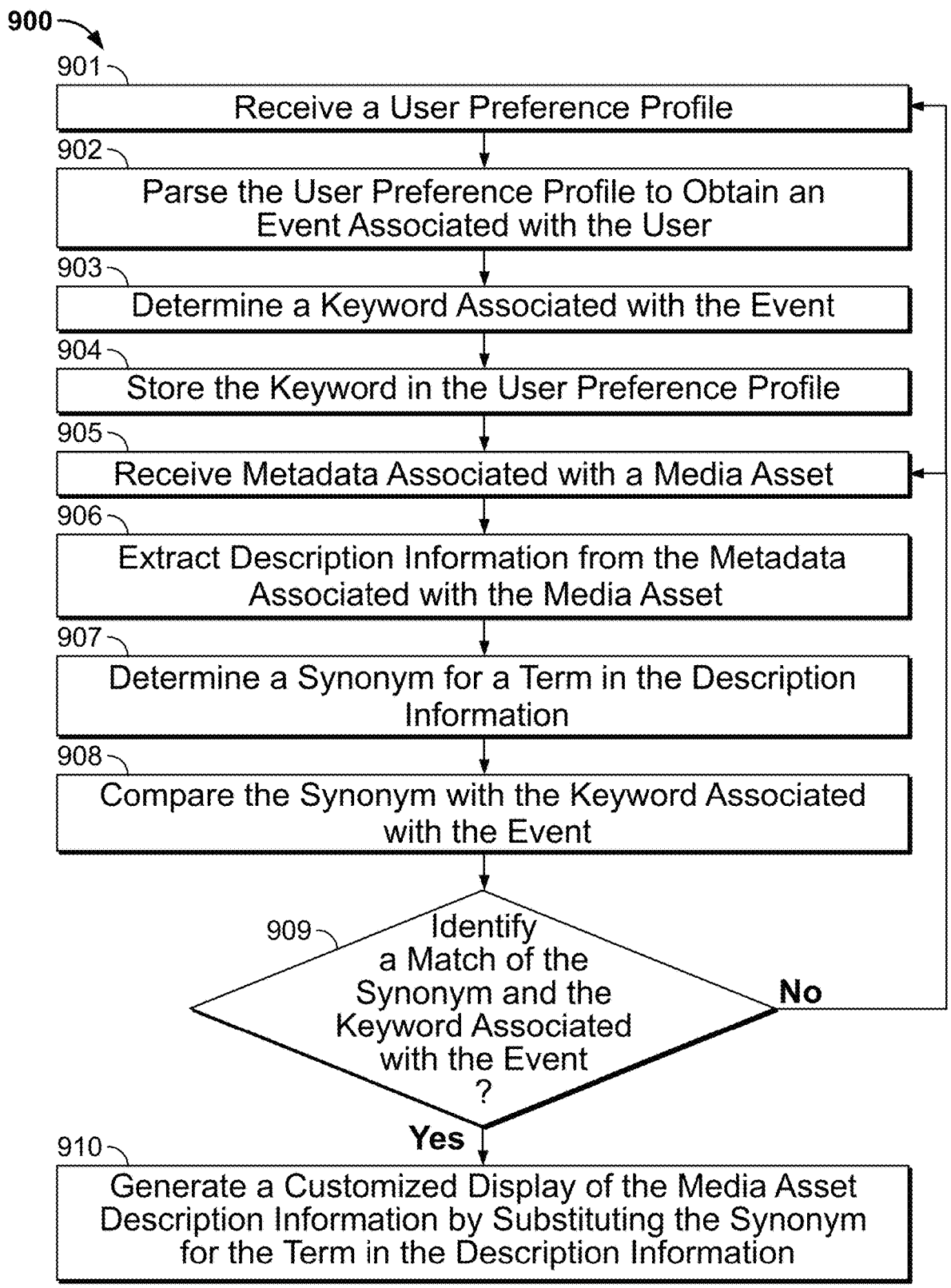
FIG. 9 is a flowchart of a detailed illustrative process for customizing a display of a media asset description in accordance with some embodiments of the disclosure.

FIG. 9 is a flowchart of illustrative steps of a process 900 for customizing a display of media asset description information in accordance with some embodiments of the disclosure. It should be noted that process 900 or any step thereof could be performed on, or provided by, any of the devices shown in FIGS. 5-6. For example, process 900 may be executed by control circuitry 504 (FIG. 5) as instructed by a media guidance application implemented on a user device (e.g., user equipment devices 602, 604, and/or 606 (FIG. 6)) in order to customize a display of media asset description information. In addition, one or more steps of process 900 may be incorporated into or combined with one or more steps of any other process or embodiment described herein.

At step 901, control circuitry 504 may receive a user preference profile from a media asset information source such as media guidance data source 618. The user preference profile data may include various information about a user, such as viewer data, that can be obtained by, for example, specific choices and information entered by the user, by monitoring a user's media interactions, and by monitoring data sources and social networks for data that is associated with the user. The control circuitry 504 may parse the user preference profile to obtain an event associated with the user at step 902. The event may be data that is stored as specified event metadata or otherwise siloed in the user preference profile to be distinguished from other user preference profile data. In some examples, event data may be data that has certain characteristics that are sought by the control circuitry 504. Some characteristics of the data may be that it is current or has a temporal component. Another characteristic of the data may be that it is associated with something outside of media assets, such as a location of the user, weather pattern, natural disaster or other incident. Another characteristic of the event data could be that it has some connection to a user that is determined from an outside source, such as a friend of the user. Event data can be obtained by monitoring a user's location or actions with media. In another example, event data can be something that as user is tagged for in social media. A user's calendar may also include event data. The event data can be stored in memory in a media guidance data source. In general, the event data may have an associated time or location element so that it can be used in a timely manner and when geographically suitable. The event data may be stored in the media guidance data store having metadata indicating that it is event data or otherwise noted with special characteristics.

At step 903, the control circuitry 504 determines a keyword associated with the event. The keyword could be a term for the event, or a term or terms that are related to the event. The keywords can be obtained by a media guidance application by referring to a glossary, dictionary, encyclopedia or other information source for the event term. The keyword can be stored in the user preference profile 618 based on an instruction from the control circuitry 504 at step 904. The keyword stored in the user preference profile 618 can include a time or temporal element, or a decay time so that it can be used when it is relevant and deleted from the user profile when it is no longer relevant. The keyword or keywords can be referred to by control circuitry 504 periodically to provide custom displays, as described herein.

The event data may also include a temporal element so that the event day can be used when it is current and relevant. For example, a time for the event data may be associated with the event. The time element can be used when selecting an event or keyword so that it is still recent. In some scenarios, a time threshold period may be set so that event data is only used if it falls within the threshold time period.

In some implementations, event data can be location based or have an associated location element. For location related event data, the relevancy of the event data can be confirmed by checking the location of the user. For example, when a user is tagged in social media as being in a hurricane watch location, if the user subsequently moves outside of the hurricane location by some set threshold distance, hurricane event data may be less relevant. In another implementation, time and location thresholds can both be used together to ensure that event data is highly relevant to the user.

At step 905, the control circuitry 504 may receive media asset data from the media guidance data source 618 or a media content source 616. The media asset data can be, for example a data record as shown in FIGS. 7-8, and include any typical data about a media asset, such as title, description, episode details, actor information, and other media asset data. The media asset data is typically arranged in a data record that has metadata indicating each data type. The control circuitry 504 can extract description information from the metadata associated with the media asset at step 906. The description information is extracted to analyze to customize a display for the user.

A term from the description information may be selected by the control circuitry 504 for which to find a synonym. In some implementations, each of the terms of the description could potentially be searched by the media guidance application for a synonym. In other implementations, only some selected terms are used to find synonyms. Additional details about such selection are discussed with reference to FIG. 10.

The control circuitry 504 may determine a synonym for one or more of the terms at step 907. The synonym may be determined by the control circuitry 504 through reference to database for a thesaurus, dictionary or other information source. Such a source may be supplied by a third party and be available via the communications network 614 or part of a reference from a media content source 616, or other source. The media guidance application may search each of the selected terms in the database to obtain a list of synonyms.

When the synonyms, or list of synonyms are determined, the control circuitry 504 may compare each synonym at step 908 to a set of keywords associated with an event in the user profile. For example, the keywords stored at step 904. The comparison of the list of synonyms and the keywords may be performed by the media guidance application and can include finding a match. The matching may be a straight match of terms or may include some root forms and related words. If no matches are found at step 909, the control circuitry 504 may return to step 901 to continue the process to update events and keywords for the user preference profile. In some implementations, if no matches are found at step 909, the control circuitry may return to step 905 to repeat the process for another media asset.

At step 909, if the control circuitry 504 identifies a match of the synonym and a keyword associated with an event, the process continues to step 910 where the control circuitry 504 may generate a customized display of the media asset description information by substituting the synonym for the term in the description information. The customization is further described with reference to FIG. 11.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 9.

Figure 10:
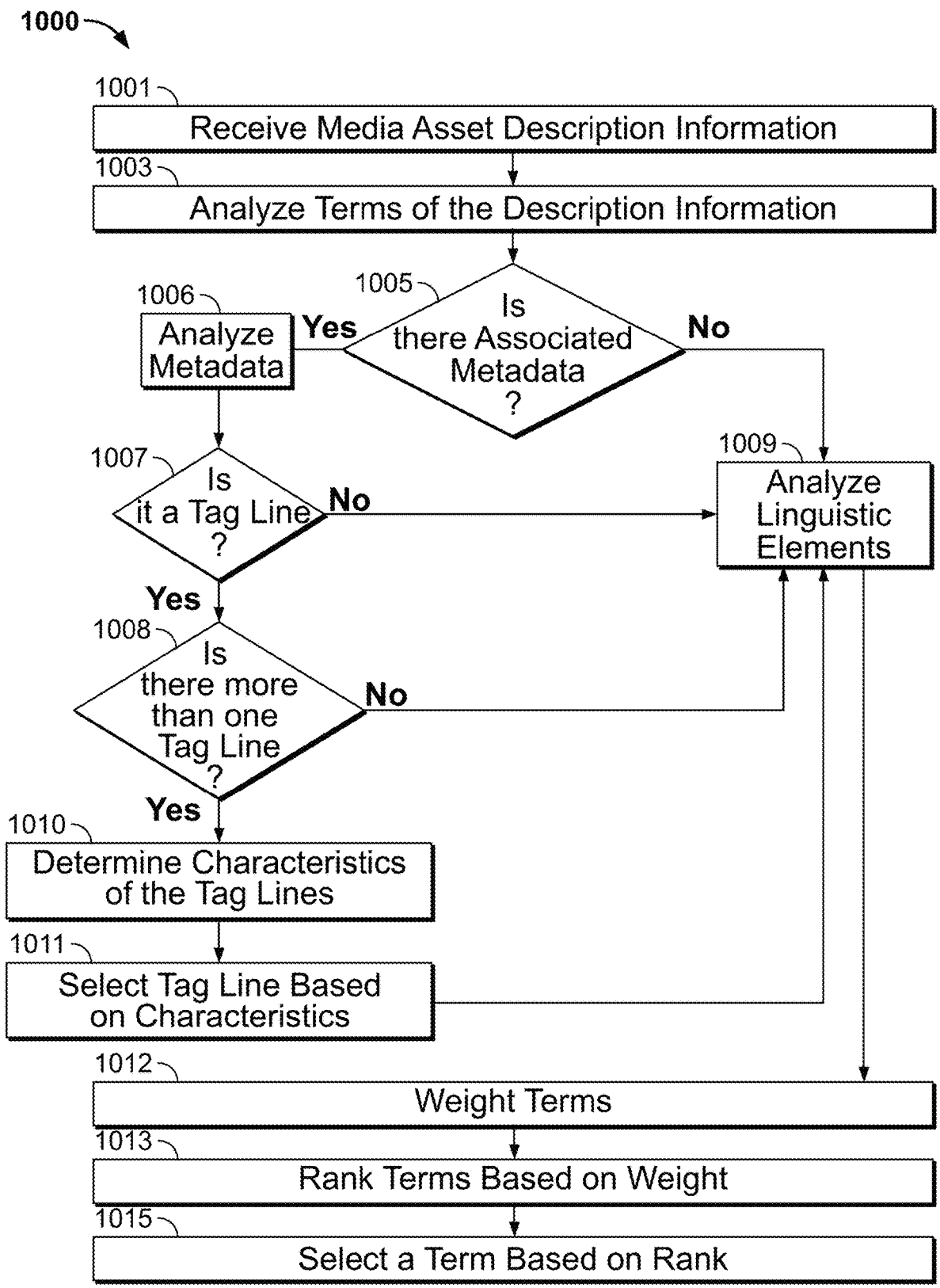
FIG. 10 is a flowchart of an illustrative process for selecting a term of the description information of a media asset to customize in accordance with some embodiments of the disclosure.

FIG. 10 is a flowchart of illustrative steps of a process 1000 for selecting a term in a media asset description for customizing a media asset display in accordance with some embodiments of the disclosure. It should be noted that process 1000 or any step thereof could be performed on, or provided by, any of the devices shown in FIGS. 5-6. For example, process 1000 may be executed by control circuitry 504 (FIG. 5) as instructed by a media guidance application implemented on a user device (e.g., user equipment devices 602, 604, and/or 606 (FIG. 6)) in order to select a term in a media asset description for customizing a media asset display. In addition, one or more steps of process 1000 may be incorporated into or combined with one or more steps of any other process or embodiment described herein.

At step 1001, the control circuitry 504 may receive media asset description information from, for example a data source such as media guidance data source 618 or media content source 616 or other data source. The control circuitry 504 may analyze the terms of the description information at step 1003. The analysis of the terms of the description information is meant to identify suitable terms to search for replacement synonyms. In some implementations, all of the terms of the description could potentially be searched, but some terms may be more suitable to search for synonyms to provide a customized display of media asset information.

One step of the analysis of the terms may be performed by the media guidance application to identify any metadata associated with the description information terms. At step 1005, the control circuitry 504 may determine whether there is any metadata associated with the description information. This determination may involve examining with the control circuitry 504 any details in a data record for the description information. In one example, the description information may have a tag line or other associated meta data. A tag line may be a slogan or catchphrase part of the description and which may serve as a catchy way to describe a media asset. The tag line metadata may be explicitly associated with the description information so that it can be identified by the media guidance application. In some implementations, the tag line metadata may be in the form of an audio or video clip that is included or associated with the description information. In some embodiments, the media guidance application may search for tag lines in the media asset by comparing segments of subtitles with number of times those segments are posted on a social network. If a given segment is posted more than a threshold number of times, the media guidance application may determine that the segment of the subtitles is a tag line and add that segment to the description for the media asset.

If metadata is found by the control circuitry 504 at step 1005, the metadata may be analyzed at step 1006 by the control circuitry 504. The metadata may be parsed by the control circuitry 504 to determine, for example, what it is, any characteristics, what it may indicate about the description information.

The control circuitry 504 may determine at step 1007 if the metadata is a tag line. The determination of whether the metadata is a tag line may involve the media guidance application finding a data characteristic indicating that it is a tag line. In some scenarios metadata may indicate that a tag line could exist in another content source in which case, the media guidance application may review audio and video clips relating to the media asset to identify or generate a tag line, and search social media to determine popularity and frequency that the clips or tag lines appear.

If the control circuitry 504 determines that there is metadata indicating that there is a tag line in the description information at step 1007, the media guidance application may determine at step 1008 whether there is more than one tag line for the media asset in the description information. The determination at step 1008 by the media guidance application may involve analyzing the metadata for indications of multiple tag lines. Since it might not be suitable to include more than one tag line in a media guidance display, a selection of one of the tag lines may be performed by the media guidance application.

At step 1010, the media guidance application may determine characteristics of the tag line. The characteristics may be used by the media guidance application at step 1011 to select a tag line. Characteristics of the tag line may be, for example, a general connection to the user based on a user preference profile, popularity of use in a social network, inclusion in advertising, or other characteristics. The characteristics may be determined by the media guidance application by considering metadata associated with the tag line and by searching information and media sources.

For the contents of the selected tag line at step 1011, the media guidance application may analyze linguistic elements of the tag line at step 1009. The linguistic element analysis may also be applied to description information that is found by the media guidance application to have no meta data at step 1005 and for description information that is found to have no tag lines found by the media guidance application at step 1007. The control circuitry 504 may analyze linguistic elements of the description information terms and tag line terms. Linguistic elements may be, for example, a type of word, a part of speech or other characteristic of the description information terms. In some examples, a noun or verb may be considered more likely to be interesting and relevant, where as an adjective or article may be less relevant. The analysis of the linguistic elements of the description information terms, may be used by the control circuitry 504 as a basis for weighting and ranking the terms.

Each of the terms may be weighted by the control circuitry 504 based the linguistic analysis by assigning a weight at step 1012. The weighting may be applied by the media guidance application to each term and the terms may then be ranked by the media guidance application based on the weighting at step 1013. The media guidance application may select a term or some terms based on the ranking at step 1015. The term or terms selected by the media guidance application may may then be searched for a synonym, for example, at step 907 (FIG. 9).

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 10.

Figure 11:
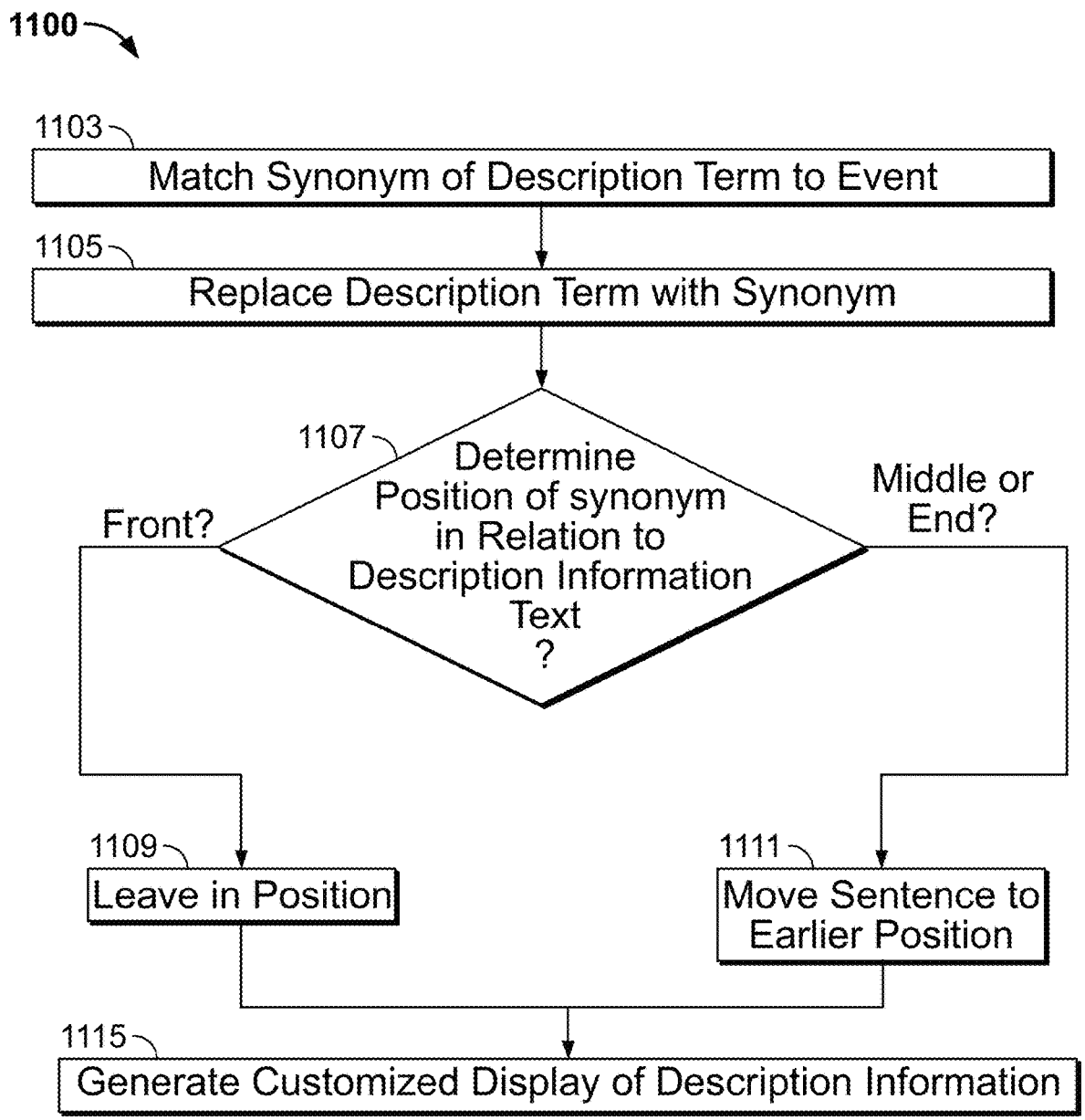
FIG. 11 is a flowchart of an illustrative process generating a customized display of description information for a media asset in accordance with some embodiments of the disclosure.

FIG. 11 is a flowchart of illustrative steps of a process 1100 for customizing a display of media asset description information in accordance with some embodiments of the disclosure. It should be noted that process 1100 or any step thereof could be performed on, or provided by, any of the devices shown in FIGS. 5-6. For example, process 1100 may be executed by control circuitry 504 (FIG. 5) as instructed by a media guidance application implemented on a user device (e.g., user equipment devices 602, 604, and/or 606 (FIG. 6)) in order to customize a display of a media asset description information. In addition, one or more steps of process 1100 may be incorporated into or combined with one or more steps of any other process or embodiment described herein.

When a synonym has been found for a description information term which matches a keyword for an event, a display may be customized following the process 1100 of FIG. 11. At step 1103, the control circuitry 504 may identify a matching synonym of a term of a description for a media asset with a keyword for an event associated with the user. This step may be the same as step 909 (FIG. 9) leading to customizing a display. The description term may be replaced by substituting it for the matching synonym at step 1105. In performing step 1105, the control circuitry 504 may store the updated description in a data record for the media asset temporarily for use in creating a custom display for the user.

In some implementations, a custom display of the media asset may include the new description information having the substituted synonym. In other implementations, the control circuitry 504 can make a determination about the relative position of the replaced synonym within the description information at step 1107. If the synonym is determined to be near the front of the text of the description information, the arrangement of the terms in the description information may be left in position at step 1109. If the synonym is determined to be at the middle or near the end of the description information, the control circuitry 504 may move a sentence or phrase including the synonym to an earlier position at step 1111. Naturally, the control circuitry 504 would need to analyze the context and linguistics of the description information to ensure that moving the sentence of phrase is logical within the context of the description.

At step 1115, the control circuitry 504 may generate a customized display of the description information by presenting a display of media assets to the user including the new custom descriptions. In some implementations, the synonym can be highlighted or made more visible by increasing a font size or color so to improve its noticeability to the user.

The custom display of the description information may stored by the media guidance application for re-use. In general, the new custom description will have an associated time or decay time so that it can be used for a threshold time period. After the threshold time period has elapsed, the media asset description may return to the original form and content. The custom description may also have an associated location so that it can be used for a threshold geographic range. When a user is determined by the media guidance application to be viewing a media guidance display from a certain location, the media guidance application may check whether the user is still in the geographic range limits. If the user has move outside of the range, the media guidance application may discard the custom description and return to using the original form and content of the description information for the media asset. If the user is determined to remain within in the geographical bounds and the time threshold period has not elapsed, the media guidance application may continue to use the custom description.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 11.

Figure 12:
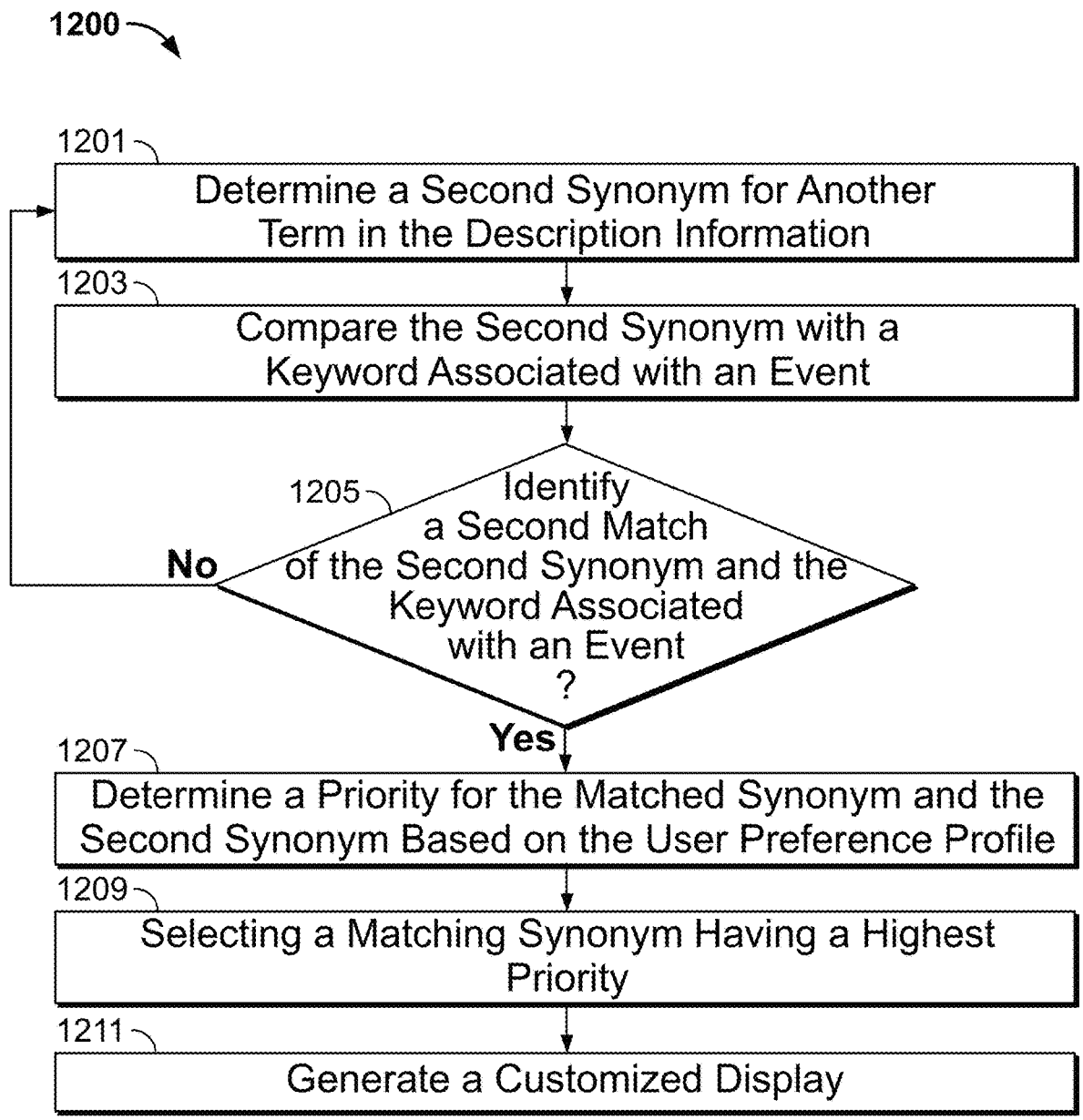
FIG. 12 is a flowchart of an illustrative process selecting a matching synonym for generating a customized display of description information for a media asset in accordance with some embodiments of the disclosure.

FIG. 12 is a flowchart of illustrative steps of a process 1200 for selecting a suitable synonym for customizing a display of media asset description information in accordance with some embodiments of the disclosure. It should be noted that process 1200 or any step thereof could be performed on, or provided by, any of the devices shown in FIGS. 5-6. For example, process 1200 may be executed by control circuitry 504 (FIG. 5) as instructed by a media guidance application implemented on a user device (e.g., user equipment devices 602, 604, and/or 606 (FIG. 6)) in order to customize a display of a media asset description information. In addition, one or more steps of process 1200 may be incorporated into or combined with one or more steps of any other process or embodiment described herein.

In some implementations, more than one synonym for more than one term may be used to enhance and customize a media asset description for a user. This can arise when a media guidance application searches for all or more than one term of a media asset description and when multiple synonyms are obtained from dictionary and thesaurus databases for the terms. Turning to FIG. 12, the media guidance application may determine another synonym set for a second term in the description information for a media asset at step 1201. The selection of the second term may be performed by the control circuitry 504 along the lines of process 1000 (FIG. 10) to select a first term. The synonym list may be obtained by the media guidance application along the lines of step 907 (FIG. 9) where the media guidance application consults a thesaurus database and searching for a synonym for the term.

The media guidance application control circuitry 504 may compare the second synonym with keywords for events in the user preference profile at step 1203. A second match may be identified by the media guidance application for the second synonym or second list of synonyms with the keywords for events in the user preference profile at decision 1205. If no match is found at step 1205 by the media guidance application, the process may return to step 1201 to continue searching for matching synonyms and keywords, or alternatively end.

The second match may be analyzed by the media guidance application to determine a priority for using the second matching synonym over the first matching synonym. In some examples, any matching synonym for any keyword may be substituted by the media guidance application in a custom display of media description information leading to a display having multiple relevant event related terms for the user. Alternatively, use of only one synonym that matches a keyword may be more eye catching for the user. To select which synonym to substitute, the media guidance application may determine a priority for the matched synonym and the second synonym based on the user preference profile at step 1207. This determination may be made by considering whether there are any additional factors for the synonym that can be obtained by the media guidance application from the user preference profile or some other source relating to the user. For example, the keyword/synonym pair may have some relation to a genre of frequent user actions, like a trip to the Caribbean event together with a pattern of watching vacation media content or posting on social media about past trips to the Caribbean or liking posts on social media relating to places in the Caribbean or hotels in the Caribbean, or food from the Caribbean, etc. In another example, a keyword/synonym matching pair may have a location aspect that is outside of the usual subjects for the user. In the former example, the keyword/synonym may be assigned a higher priority than the latter example. In another example, a time element may be associated with the keyword and the synonym may be prioritized according to the time.

The media guidance application may select a matching synonym having a highest priority at step 1209 and generate a custom display for a media asset description at step 1211 by using the selected synonym as a substitute for the term in the media asset description information.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 11.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   identifying descriptive metadata of a media asset, wherein the descriptive metadata comprises at least one target word;
   in response to a selection of the media asset, identifying a social media profile, wherein activity on at least one social media platform is stored in the social media profile;

determining at least one candidate word that corresponds to the at least one target word based on the social media profile;

determining whether a first context of the at least one target word matches at least a portion of a second context of the at least one candidate word; and in response to determining the first context matches at least the portion of the second context, generating a customized view for display of the media asset descriptive metadata by replacing the at least one target word with the at least one candidate word in the descriptive metadata.

2. The method of claim 1, further comprising:

parsing the descriptive metadata, wherein the at least one target word is identified based on the parsing.

3. The method of claim 1, wherein the customized view for the display of the media asset descriptive metadata comprises one of a group of highlighting of a portion of the description metadata having the at least one candidate word and placing the at least one target word in a prominent position indicating the at least one target word is replaced by the at least one candidate word.

4. The method of claim 1, wherein the at least one target word is identified as a first candidate for substitution by the control circuitry by:

analyzing each word in the descriptive metadata to determine a respective type of linguistic element;

assigning a weight for each type of linguistic element; and prioritizing each word in the descriptive metadata based on the weight of the linguistic element associated with the respective type of linguistic element of each respective word in the descriptive metadata.

5. The method of claim 1, wherein the at least one target word is identified as a first candidate for substitution by the control circuitry by:

analyzing video or audio information associated with the media asset to identify a tag line for the media asset; and analyzing each term or phrase in the tag line to detect a noun or a verb.

6. The method of claim 1, further comprising:

analyzing with the control circuitry, video or audio information associated with the media asset to identify a plurality of tag lines for the media asset;

parsing the plurality of tag lines to identify a term having an association with the social media profile;

ranking the plurality of tag lines based on the association with the social media profile; and selecting by the control circuitry a highest ranking tag line from the plurality of tag lines to include in the customized view for display of the media asset descriptive metadata.

7. The method of claim 1, further comprising:

reviewing with the control circuitry, a plurality of words comprising the descriptive metadata to identify a relative position within the description information of the at least one target word; and when the relative position is determined to be near the end of the plurality of words comprising descriptive metadata, reordering a sentence including the at least one candidate word to an earlier position in the description information.

8. The method of claim 1, wherein determining at least one candidate word that corresponds to the at least one target word based on activity on the at least one social media platform by the social media profile comprises:

parsing, with the control circuitry, the activity corresponding to the social media profile to obtain an event associated with the social media profile, wherein the event comprises one of the group of a user action associated with media assets, a user action associated with a media guidance application, and a location of the user; and identifying, with the control circuitry, the at least one candidate word in descriptive metadata associated with the event.

9. The method of claim 7, wherein the event is added to the social media profile by:

accessing via the control circuitry, a social network associated with a user corresponding to the social media profile;

analyzing by the control circuitry, data added to the social network by a friend of the user, wherein the data is retrievable via the social media profile; and detecting by the control circuitry, in the analyzed data, data associated with the user that identifies the event.

10. The method of claim 7, wherein the event comprises one of a group of a natural disaster, a news article, a location, and a weather pattern.

11. A system comprising:

memory; and control circuitry configured to:

identify descriptive metadata of a media asset, wherein the descriptive metadata comprises at least one target word;

in response to a selection of the media asset, identify a social media profile;

determine at least one candidate word that corresponds to the at least one target word based the social media profile;

determine whether a first context of the at least one target word matches at least a portion of a second context of the at least one candidate word; and in response to determining the first context matches at least the portion of the second context, generate a customized view for display of the media asset descriptive metadata by replacing the at least one target word with the at least one candidate word in the descriptive metadata.

12. The system of claim 11, wherein the control circuitry is further configured to:

parse the descriptive metadata, wherein the at least one target word is identified based on the parsing.

13. The system of claim 11, wherein the customized view for the display of the media asset descriptive metadata comprises one of a group of highlighting of a portion of the description metadata having the at least one candidate word and placing the at least one target word in a prominent position indicating the at least one target word is replaced by the at least one candidate word.

14. The system of claim 11, wherein the control circuitry configured to identify the at least one target word as a first candidate for substitution is further configured to:

analyze each word in the descriptive metadata to determine a respective type of linguistic element;

assign a weight for each type of linguistic element; and prioritize each word in the descriptive metadata based on the weight of the linguistic element associated with the respective type of linguistic element of each respective word in the descriptive metadata.

15. The system of claim 11, wherein the control circuitry configured to identify the at least one target word as a first candidate for substitution is further configured to:

analyze video or audio information associated with the media asset to identify a tag line for the media asset; and analyze each term or phrase in the tag line to detect a noun or a verb.

16. The system of claim 11, wherein the control circuitry is further configured to:

analyze with the control circuitry, video or audio information associated with the media asset to identify a plurality of tag lines for the media asset;

parse the plurality of tag lines to identify a term having an association with the social media profile;

rank the plurality of tag lines based on the association with the social media profile; and select by the control circuitry a highest ranking tag line from the plurality of tag lines to include in the customized view for display of the media asset descriptive metadata.

17. The system of claim 11, wherein the control circuitry is further configured to:

review a plurality of words comprising the descriptive metadata to identify a relative position within the description information of the at least one target word; and when the relative position is determined to be near the end of the plurality of words comprising descriptive metadata, reorder a sentence including the at least one candidate word to an earlier position in the description information.

18. The system of claim 11, wherein the control circuitry configured to determine at least one candidate word that corresponds to the at least one target word based on activity on the at least one social media platform by the social media profile is further configured to:

parse activity corresponding to the social media profile to obtain an event associated with the social media profile, wherein the event comprises one of a group of a user action associated with media assets, a user action associated with a media guidance application, and a location of the user; and identify the at least one candidate word in descriptive metadata associated with the event.

19. The system of claim 18, wherein the control circuitry is further configured to add the event to the social media profile by:

accessing a social network associated with a user corresponding to the social media profile;

analyzing data added to the social network by a friend of the user, wherein the data is retrievable via the social media profile; and detecting, in the analyzed data, data associated with the user that identifies the event.

20. The system of claim 18, wherein the event comprises one of a group of a natural disaster, a news article, a location, and a weather pattern.

* * * * *